United States Patent [19]

Tezuka et al.

[11] Patent Number: 4,827,804

[45] Date of Patent: May 9, 1989

[54] SYSTEM FOR CONTROLLING THE PRESSURE OF OIL IN A SYSTEM FOR A CONTINUOUSLY VARIABLE TRANSMISSION

[75] Inventors: Kazunari Tezuka, Asaka; Yasuhito Sakai, Higashimurayama, both of Japan

[73] Assignee: Fuji Jukogyo Kabushiki Kaisha, Tokyo, Japan

[21] Appl. No.: 928,983

[22] Filed: Nov. 10, 1986

[30] Foreign Application Priority Data

Nov. 18, 1985 [JP] Japan .................. 60-258137

[51] Int. Cl.$^4$ .......................................... B60K 41/12
[52] U.S. Cl. ....................................... 74/866; 74/867
[58] Field of Search ............... 74/866, 867, 868, 864, 74/865; 474/11, 12, 18, 28; 364/424.1; 192/3.58, 3.51, 0.073

[56] References Cited

U.S. PATENT DOCUMENTS

| 4,369,675 | 1/1983 | van Deursen | 74/864 |
| 4,387,608 | 6/1983 | Mohl et al. | 74/866 |
| 4,459,878 | 7/1984 | Frank | 74/866 X |
| 4,522,086 | 6/1985 | Haley | 74/867 |
| 4,605,112 | 8/1986 | Takano | 474/28 X |
| 4,628,773 | 12/1986 | Itoh et al. | 74/868 X |
| 4,641,553 | 2/1987 | Kobayashi | 74/866 |
| 4,644,827 | 2/1987 | Takano et al. | 74/866 |
| 4,651,595 | 3/1987 | Miyawaki | 74/866 |
| 4,653,006 | 3/1987 | Osanai et al. | 74/866 X |
| 4,665,775 | 5/1987 | Nagamatsu | 74/868 |
| 4,669,336 | 6/1987 | Okada et al. | 74/868 X |
| 4,674,363 | 6/1987 | Miyawaki | 74/866 |
| 4,680,987 | 7/1987 | Morimoto | 74/866 |
| 4,680,990 | 7/1987 | Ohgami | 74/866 X |

FOREIGN PATENT DOCUMENTS 58-88252 5/1983 Japan .

Primary Examiner—Leslie A. Braun
Assistant Examiner—David Novais
Attorney, Agent, or Firm—Martin A. Farber

[57] ABSTRACT

A control system for a motor vehicle provided with a clutch and a continuously variable transmission. The transmission has a line pressure control valve having ports and a spool for controlling the line pressure of oil supplied to a cylinder of a pulley device to change the transmission ratio. When the clutch is disengaged, the line pressure is set to a minimum value sufficient for tensing a belt of the pulley device for preventing the belt from slipping when the clutch is re-engaged.

15 Claims, 6 Drawing Sheets

4,827,804

SYSTEM FOR CONTROLLING THE PRESSURE OF OIL IN A SYSTEM FOR A CONTINUOUSLY VARIABLE TRANSMISSION

System for controlling the pressure of oil in a system for a continuously variable transmission

BACKGROUND OF THE INVENTION

The present invention relates to a control system for a continuously variable belt-drive automatic transmission for a motor vehicle, and more particularly to a system for controlling line pressure in a hydraulic circuit for the transmission.

A known control system for a continuously variable belt-drive transmission disclosed in U.S. Pat. No. 4,369,675 comprises an endless belt running over a drive pulley and a driven pulley. Each pulley comprises a movable conical disc which is axially moved by a fluid operated servo device so as vary the running diameter of the belt on the pulleys in dependency on driving conditions. The system is provided with a hydraulic circuit including a pump, a line pressure control valve and a transmission ratio control valve. Each valve comprises a spool to control the oil supplied to the servo devices.

The transmission ratio control valve operates determine the transmission ratio in accordance with the opening degree of a throttle valve of an engine and the speed of the engine. The line pressure control valve is adapted to control the line pressure in accordance with the transmission ratio and the engine speed. The line pressure is controlled to prevent the belt from slipping on the pulleys in order to transmit the output of the engine.

Japanese Patent Laid Open No. 58-88252 discloses an electronic control system for controlling the line pressure in accordance with transmission ratio and engine torque. The transmission ratio is determined by the ratio of the speed of the driven pulley to the speed of the drive pulley. When the vehicle is at a stop, both pulleys stop because of disengagement of a clutch. Since input signals based on the speeds of both pulleys disappear, it is impossible to control the line pressure dependent on the transmission ratio.

SUMMARY OF THE INVENTION

Accordingly, the object of the present invention is to provide a system which may control the line pressure to an optimum value at the stopping of a vehicle.

According to the present invention, there is provided a control system for a continuously variable transmission for transmitting the power of an internal combustion engine to driving wheels of a motor vehicle through a clutch, having a drive pulley including a hydraulically shiftable disc and a first hydraulic cylinder for shifting the disc, a driven pulley including a hydraulically shiftable disc and a second hydraulic cylinder for operating the disc of the driven pulley a belt engaged with both pulleys, a line pressure control valve having ports and a spool, a transmission ratio control valve having ports and a spool, a first hydraulic circuit having a pump for supplying oil to the first and second cylinders.

The system comprises a second hydraulic circuit for supplying the oil to the line pressure control valve so as to shift the spool, control valve means provided in the second hydraulic circuit for controlling the amount of the oil supplied to the line pressure control valve, first means for detecting disengagement of said clutch and for producing a first signal, second means responsive to the first signal for controlling said control valve means to produce a low line pressure necessary to tense the belt so as to prevent slipping thereof at engagement of the clutch.

The other objects and features of this invention will become understood from the following description with reference to the accompanying drawings.

DETAILED DESCRIPTION OF THE PREFERRED EMBODIMENT

Figure 1:
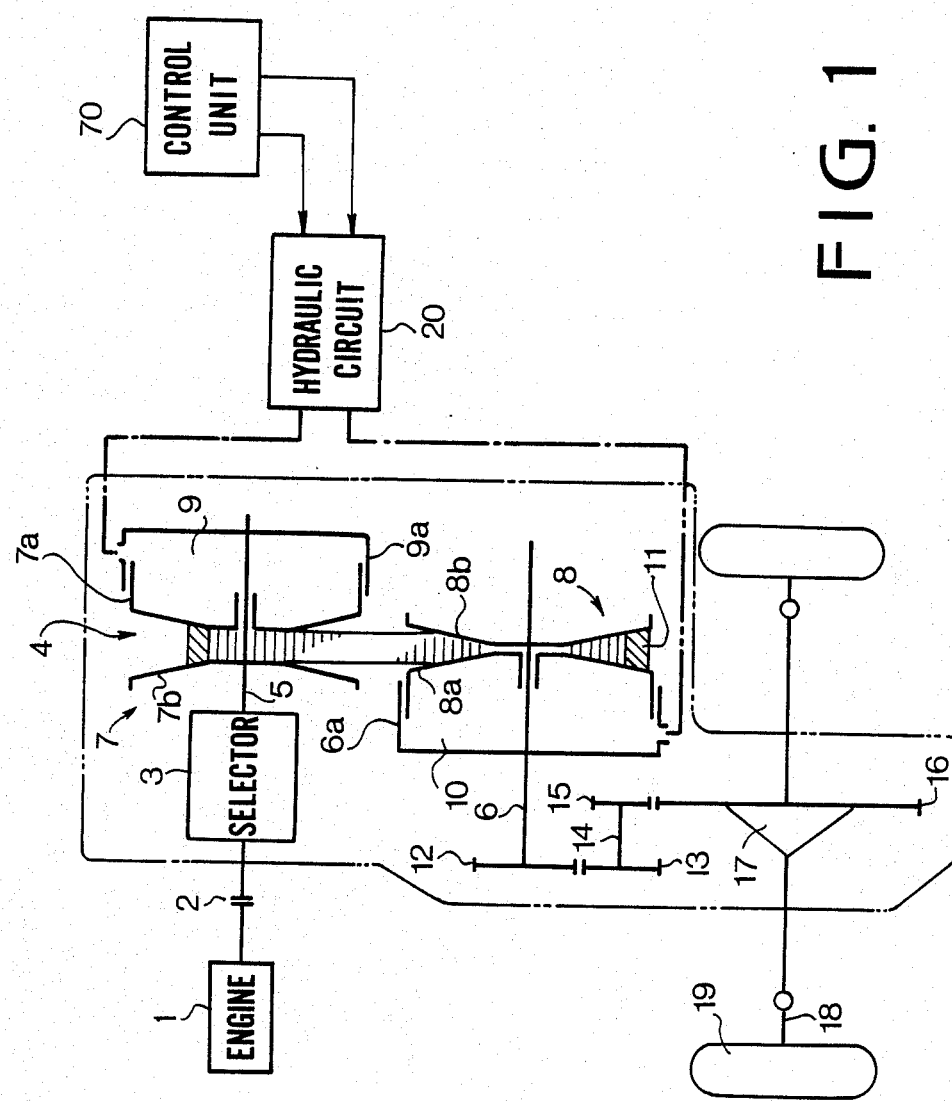
FIG. 1 is a schematic illustration of a continuously variable belt-drive transmission.

Referring to FIG. 1, a motor vehicle is provided with an engine 1, an electromagnetic powder clutch 2 for transmitting the power of the engine to a continuously variable belt-drive transmission 4 through a selector mechanism 3.

The belt-drive transmission 4 has a main shaft 5 and an output shaft 6 provided in parallel with the main shaft 5. A drive pulley (primary pulley) 7 and a driven pulley (secondary pulley) 8 are mounted on the shafts 5 and 6 respectively. A fixed conical disc 7b of the drive pulley 7 is integral with the main shaft 5 and an axially movable conical disc 7a is axially slidably mounted on the main shaft 5. The movable conical disc 7a also slides in a cylinder 9a formed on the main shaft 5 to provide a servo device. A chamber 9 of the servo device communicates with a hydraulic circuit 20.

A fixed conical disc 8b of the driven pulley 8 is formed on the output shaft 6 opposite a movable conical disc 8a. The conical disc 8a has a cylindrical portion which is slidably engaged in a cylinder 6a of the output shaft 6 to form a servo device. A chamber 10 of the servo device is also communicated with control circuit 20. A drive belt 11 engages with the drive pulley 7 and the driven pulley 8.

Secured to the output shaft 6 is a drive gear 12 which engages with an intermediate reduction gear 13 on an intermediate shaft 14. An intermediate gear 15 on the shaft 14 engages with a final gear 16. The rotation of the final gear 16 is transmitted to axles 18 of vehicle driving wheels 19 through a differential 17.

Figure 2A:
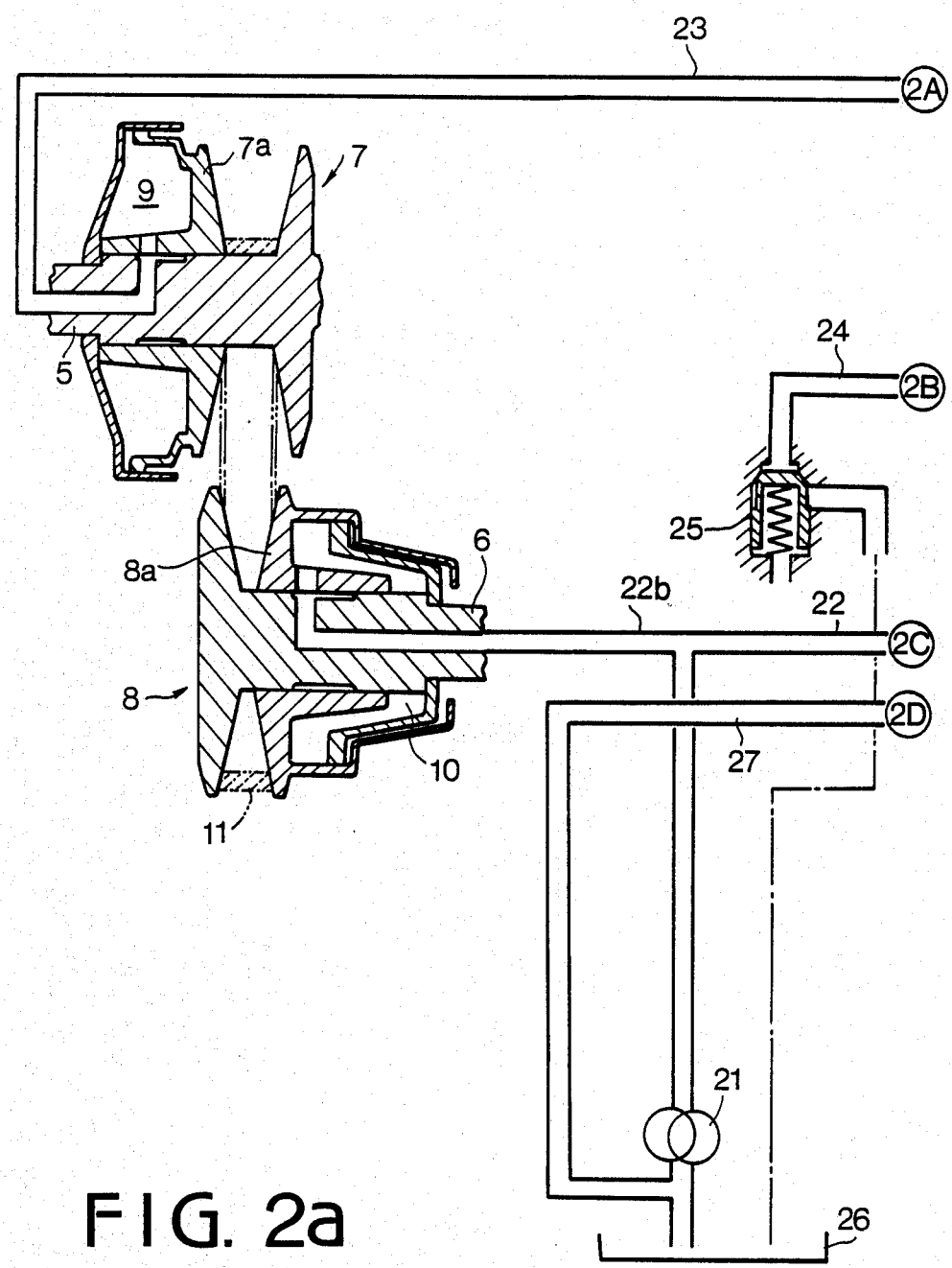
FIGS. 2a and 2b are schematic diagrams showing a control system according to the present invention.
Figure 2B:
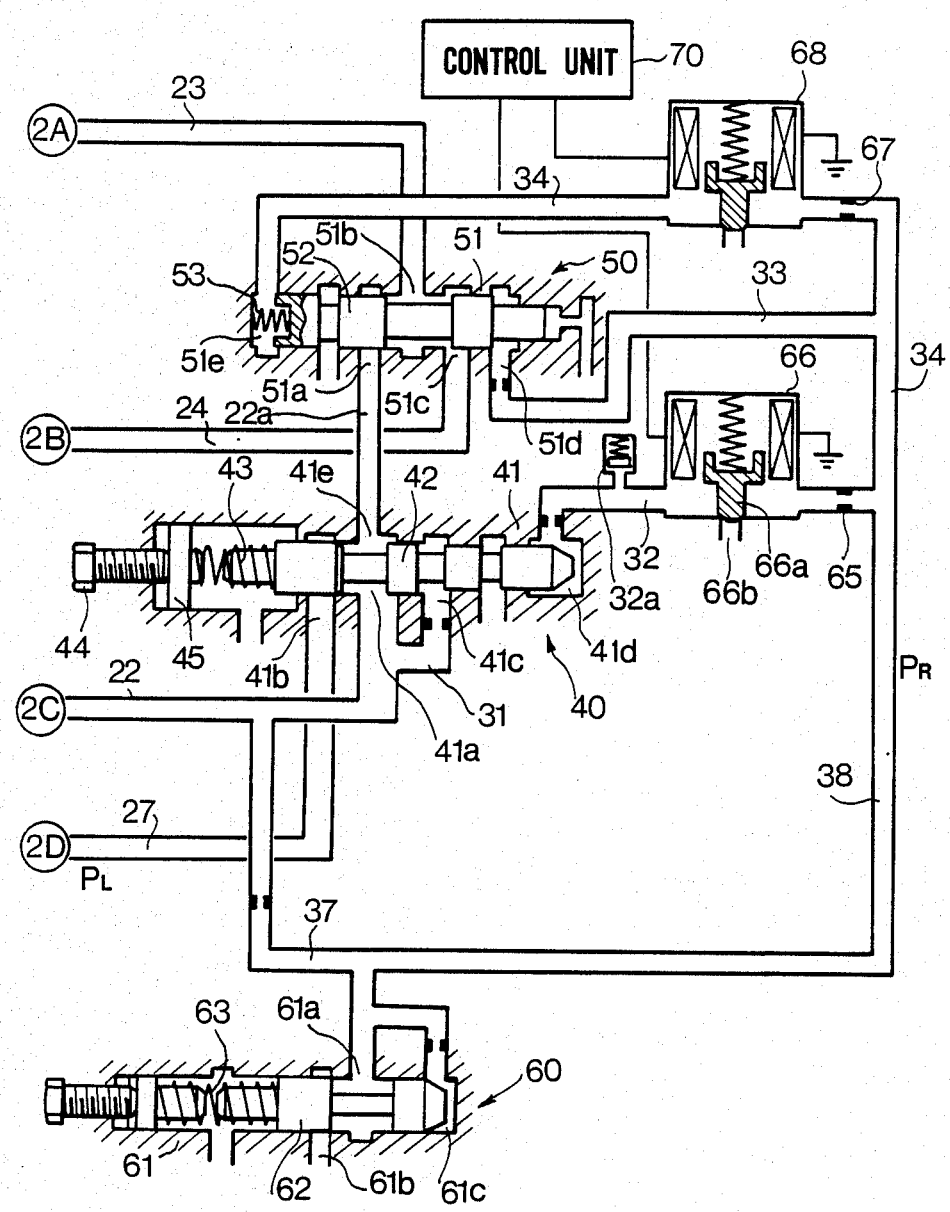

Referring to FIGS. 2a and 2b, the chamber 9 of the drive pulley 7 is supplied with pressurized oil by an oil pump 21 from an oil reservoir 26 passing through a line pressure conduit 22, inlet and outlet ports 41a and 41e of a line pressure control valve 40, a transmission ratio control valve 50, and a conduit 23. The chamber 10 of the driven pulley 8 is supplied with pressurized oil through a passage 22b connected to the conduit 22. Thus, pressure of oil in the chamber 10 is controlled by the line pressure control valve 40 as described hereinafter. The movable conical disc 7a of the drive pulley 7 is so designed that the pressure receiving area thereof is larger than that of the movable conical disc 8a of the driven pulley 8. The line pressure control valve 40 comprises a valve body 41, spool 42, and chambers 41c and 41d. The spool 42 is applied with pressure of the pressurized oil in the chamber 41c supplied through a conduit 31. The other end of the spool 42 is applied with the force of a spring 43 provided between the end of the spool 42 and a retainer 45, the position of which is adjustable by a screw 44. The port 41a is communicated with a drain port 41b for a drain passage 27 in accordance with the position of a land of the spool 42. The drain port 41b communicates with oil reservoir 26 through passage 27.

The transmission ratio control valve 50 comprises a valve body 51, spool 52, and a spring 53 for urging the spool 52 in the downshift direction. A port 51b of the valve body 51 is selectively communicated with a pressure oil supply port 51a or a drain port 51c in accordance with the position of lands of spool 52. Port 51b communicates with chamber 9 through conduit 23, and port 51a communicates with port 41e of line pressure control valve 40 through conduit 22a. The drain port 51c is communicated with the oil-reservoir 26 through a conduit 24 and a check valve 25.

The system is provided with a regulator valve 60, and solenoid operated on-off control valves 66 and 68.

The regulator valve 60 comprises a valve body 61, an inlet port 61a connected to the pump 21 through passages 37 and 22, a spool 62, an end chamber 61c connected to the passage 37, and a spring 63 urging the spool 62 to the chamber 61c. When the pressure of oil in the chamber 61c becomes higher than a set value, the spool 62 is shifted to the left, so that an inlet port 61a communicates with a drain port 61b to drain the oil. Thus, a constant pressure of oil is provided in the passage 37.

The passage 37 is communicated with the chamber 41d of the line pressure control valve 40 through a constant pressure passage 38, orifice 65, solenoid operated on-off valve 66, and passage 32 having an accumulator 32a. Further, the passage 38 is communicated with an end chamber 51d of the transmission ratio control valve 50 through a passage 33, and with another end chamber 51e through a passage 34, orifice 67, and solenoid operated on-off valve 68. The solenoid operated on-off valve 66 is adapted to be operated by pulses. When energized, a valve 66a opens a drain port 66b. The pulsation of the pressure of oil in the passage 32 is smoothed by accumulator 32a. The solenoid operated on-off valve 68 is the same as valve 66 in construction and operation. The control valves 66 and 68 are operated by signals from a control unit 70. Thus, pressure controlled by the control valves 66 and 68 is applied to chambers 41d and 51e.

In the transmission ratio control valve 50, pressure receiving area of the spool 52 at chamber 51e is set to a value larger than the area at the chamber 51d. On the other hand, the control pressure in the chamber 51e can be changed between a maximum value, which is the same as the constant pressure in the chamber 51d, when the duty ratio is 0% and zero by controlling the duty ratio of pulses for operating the control valve 68. The transmission ratio control valve 50 is so arranged that the spool 52 is at a neutral position at a middle duty ratio (for example 50%) and is located in an oil supply position by increasing the duty ratio from the middle duty ratio because of reduction of control pressure in the chamber 51e. Further, the speed of the movement of the spool 52 changes with the magnitude of changing of the duty ratio. The spool 52 is shifted to an oil drain position by decreasing the duty ratio. It will be understood that when the oil is supplied to the chamber 9, the transmission is upshifted.

Figure 3A:
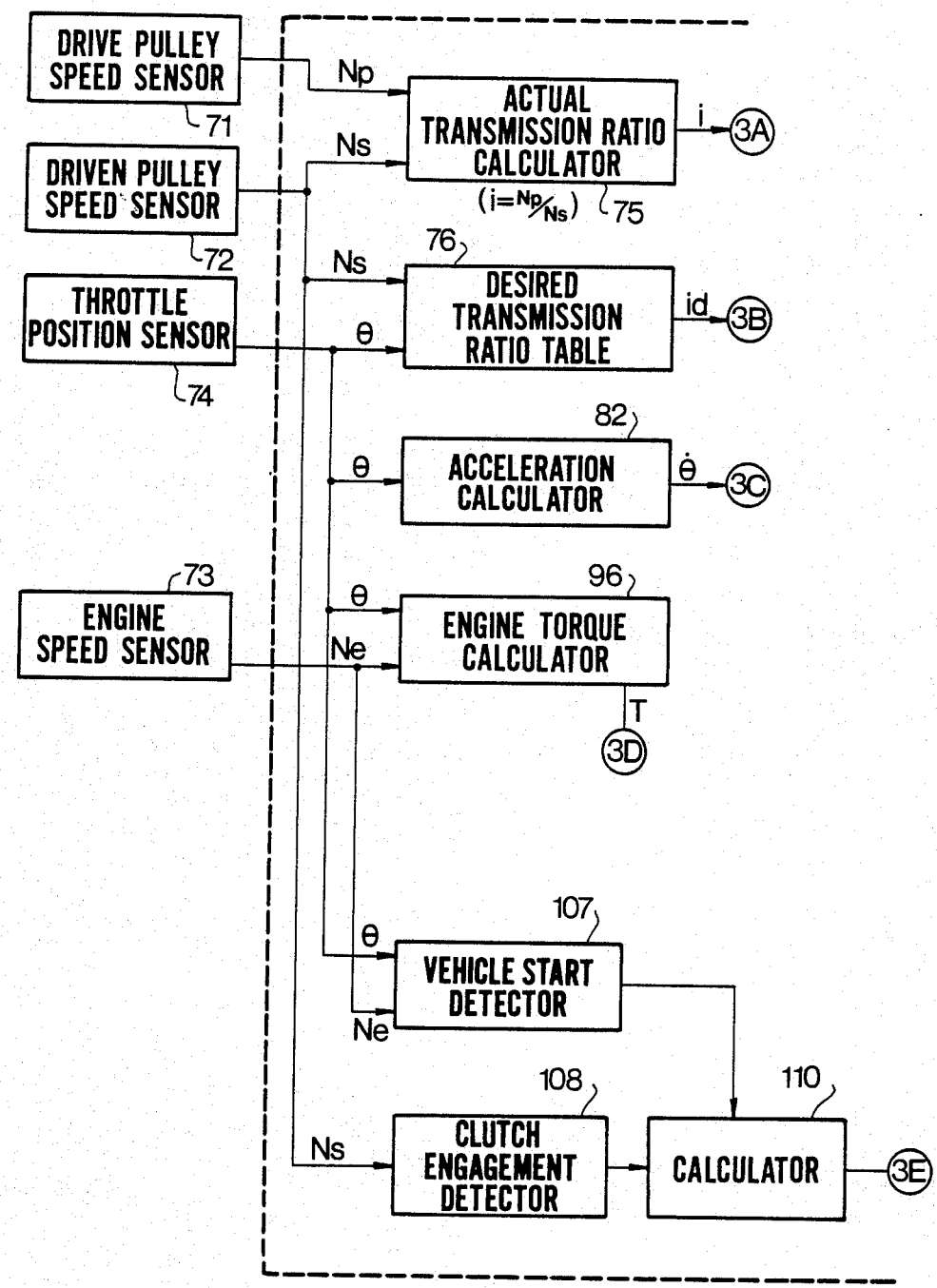
FIGS. 3a and 3b are block diagrams showing a control unit.
Figure 3B:
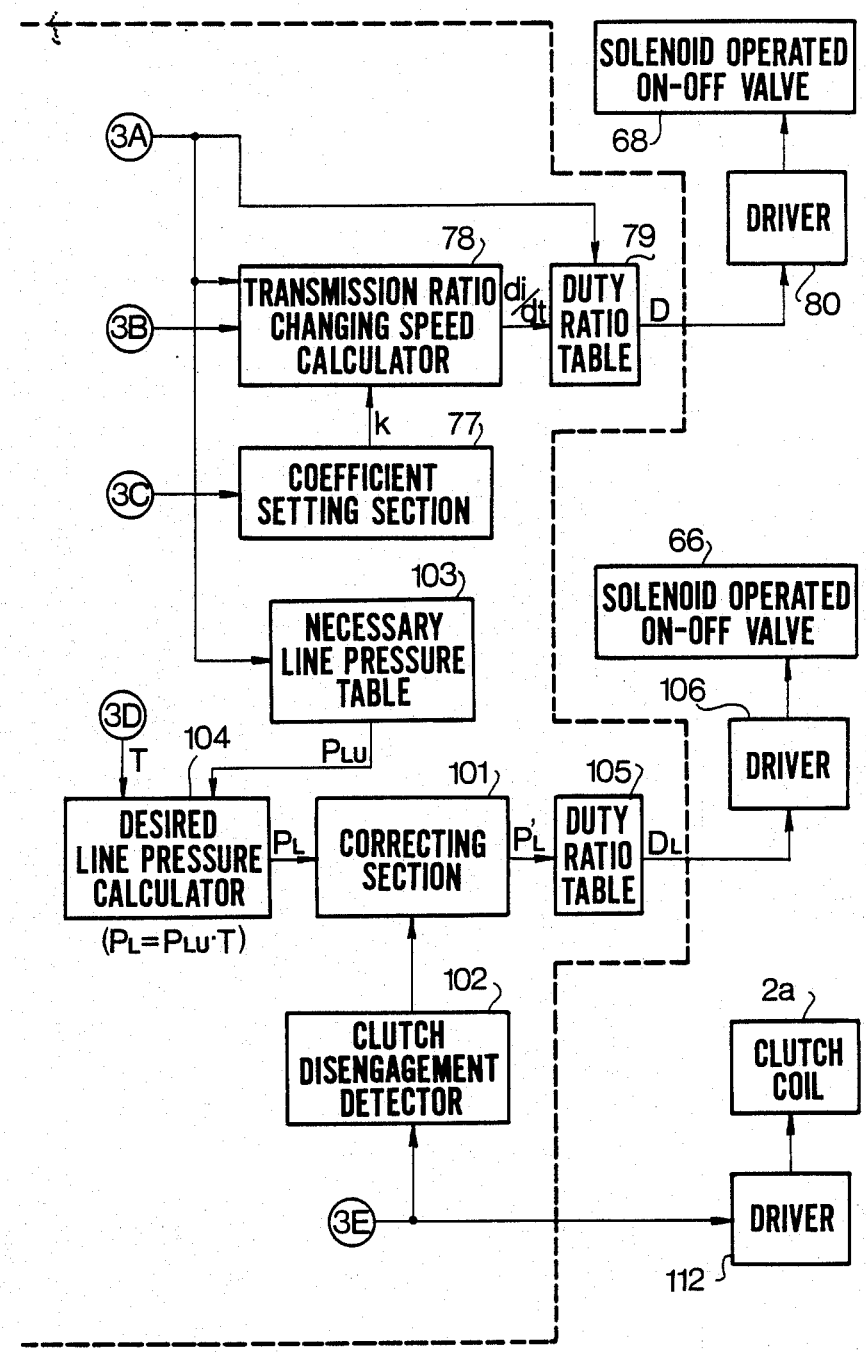

Referring to FIGS. 3a and 3b, a drive pulley speed sensor 71, driven pulley speed sensor 72, engine speed sensor 73 and throttle valve position sensor 74 are provided. Output signals $N_p$ and $N_s$ of sensors 71, 72 are fed to an actual transmission ratio calculator 75 to produce an actual transmission ratio i in accordance with $i = N_p/N_s$. Output signal $N_s$ and output signal $\theta$ of the throttle valve position sensor 74 are fed to a desired transmission ratio table 76. The desired transmission ratio id is fetched from the table 76 in accordance with the signals $N_s$ and $\theta$. On the other hand, the output $\theta$ is fed to an acceleration calculator 82 to obtain acceleration $\dot\theta$. The signal of the acceleration $\dot\theta$ is supplied to a coefficient setting section 77 to produce a coefficient K. The actual transmission ratio i, desired transmission ratio id and coefficient K from the coefficient setting section 77 are applied to a transmission ratio changing speed calculator 78 to produce a transmission ratio changing speed di/dt from the formula $di/dt = K(id - i)$.

The speed di/dt and actual ratio i are applied to a duty ratio table 79 to derive the duty ratio D. The duty ratio D is supplied to the solenoid operated valve 68 through a driver 80.

On the other hand, the output signal $\theta$ of throttle position sensor 74 and the output $N_e$ of engine speed sensor 73 are fed to an engine torque calculator 96, so that engine torque T is calculated based on throttle position $\theta$ and engine speed $N_e$.

On the other hand, the actual transmission ratio i from the calculator 75 is applied to a necessary line pressure table 103 to derive a necessary line pressure $P_{LU}$ per unit torque. The necessary line pressure $P_{LU}$ and the engine torque T are applied to a desired line pressure calculator 104 which calculates a desired line pressure $P_L$.

The desired line pressure $P_L$ is applied to a duty ratio table 105 through a correcting section 101 to derive a duty ratio $D_L$ corresponding to a desired line pressure $P_L$ or to corrected line pressure $P_L'$. The duty ratio $D_L$ is supplied to a driver 106 which operates the solenoid operated on-off valve 66 at the duty ratio.

Further, the signal $N_e$ of the engine speed sensor 73 and the signal $\theta$ of the throttle position sensor 74 are supplied to a vehicle start detector 107 and the output $N_s$ of drive pulley speed sensor 72 is applied to a clutch engagement detector 108. The outputs of both detectors 107 and 108 are fed to a calculator 110 to produce a clutch current signal. The clutch current signal is applied to a clutch coil 2of the clutch 2 through a driver 112 to control the clutch. Further, the clutch current signal is applied to the correcting section 101 through a clutch disengagement detector 102.

In operation, while the vehicle is at a stop, chamber 10 of the driven pulley 8 is supplied with line pressure through passage 22b, and the chamber 9 of the drive pulley 7 is drained, since $N_P$, $N_S$, $\theta$ and duty ratio D are zero, and the spool 52 is at the right end position and the drain port 51c communicates with the chamber 9 through the conduit 23 as shown in FIGS. 2a and 2b. Thus, in the pulley and belt device of the continuously variable belt-drive transmission, the driving belt 11 engages with the driven pulley 8 at a maximum running diameter to provide the largest transmission ratio (low speed stage). When the accelerator pedal is depressed, the vehicle start detector 107 produces a vehicle start signal. In response to the start signal, the calculator 110 produces the clutch current signal. Thus, the clutch current increases progressively with increase of engine speed, so that the electromagnetic clutch 2 is gradually engaged, transmitting the engine power to the drive pulley 7. The power of the engine is transmitted to the output shaft 6 at the largest transmission ratio by the driving belt 11 and driven pulley 8, and further transmitted to the axles 18 of the driving wheels 19. Thus, the vehicle is started.

At that time the line pressure is at the highest value by the pressure control valve 40, since the duty ratio for the valve 66 is large, and the spool 42 of the control valve 40 is at the right end position. Accordingly, the drain port 41b is closed by the land of the spool 42 as shown in FIG. 2b, so that line pressure at inlet port 41a is raised. The highest line 22b. When the throttle valve is opened for acceleration, the desired transmission ratio id and transmission ratio changing speed di/dt are calculated by calculators 76, 78, and duty ratio D is obtained from the table 79. The value of the duty ratio D is larger than the neutral value, so that the pressure in the chamber 51d of the control valve 50 is higher than the chamber 51e. Thus, the spool 52 is shifted to the left to communicate the port 51a with port 51b, so that oil is supplied to the chamber 9 from the chamber 10 through the passages 22b, 22, valves 40, 50 and through the conduit 23, since the pressure receiving area of the disc 7a is larger than the disc 8a. On the other hand, the duty ratio for the control valve 66 is reduced, thereby shifting the spool 42 of the valve 40 to the left. The port 41a communicates with the port 41b of the drain passage 27. Thus, line pressure reduces, and the transmission is upshifted, since oil is still supplied to the chamber 9 through the control valve 50. When the vehicle speed (output signal $N_s$) exceeds a predetermined value, detector 108 produces a clutch engagement signal. By the engagement signal, the clutch 2 is entirely engaged.

The control operation of line pressure will be described hereinafter with reference to FIGS. 2a, 2b, 3a, 3b, and 4. From the engine torque table 96, a torque T is obtained in accordance with throttle position $\theta$ and engine speed $N_e$, which is applied to desired line pressure calculator 104. The calculator calculates a desired line pressure $P_L$. The solenoid operated on-off valve 66 is operated at a duty ratio corresponding to the desired line pressure $P_L$. The line pressure is applied to chamber 10 to hold the belt 11 at a necessary minimum force, the transmitting torque at which is slightly larger than torque T. Thus, power is transmitted through the transmission without slipping of the belt.

Figure 4:
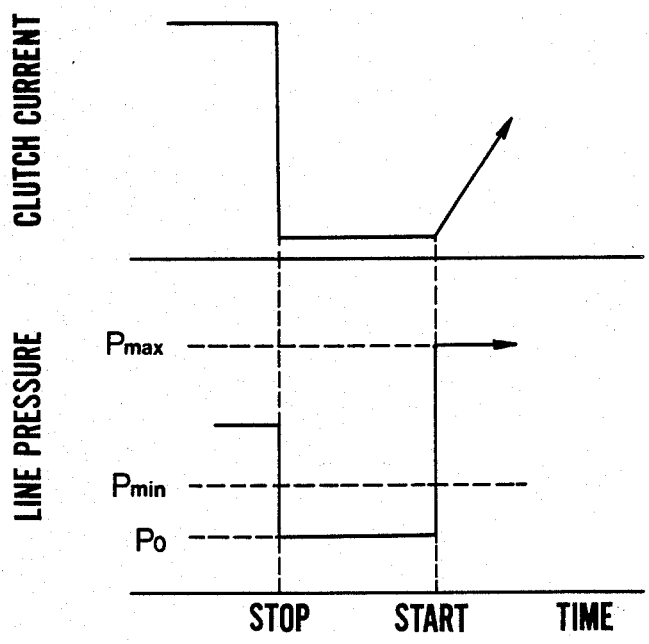
FIG. 4 is a graph showing variation of clutch current and line pressure.

When the vehicle speed decreases below a predetermined value, the clutch current is cut off to disengage the clutch 2. When the cutting off of the clutch current continues for a predetermined period, the clutch disengagement detector 102 produces a correct signal which is applied to correcting section 101. By the correct signal, correcting section 101 operates to reduce the line pressure from a minimum value Pmin during the driving of the vehicle to an allowable minimum value $P_o$ as shown in FIG. 4. The minimum value $P_o$ is set to a necessary minimum value as to tense the belt, so that when the clutch is re-engaged, the belt transmits the power of the engine to the driving wheels without slipping, thereby smoothly re-starting the vehicle.

As shown in FIG. 4, when the accelerator pedal is re-depressed (start), current increases gradually and line pressure increases to a maximum value Pmax. Thus, the vehicle can be smoothly started without slipping of the belt occurring.

In accordance with the present invention, since the line pressure is controlled to a necessary minimum value at stopping of the vehicle, load on the engine is reduced, thereby decreasing vibration of the vehicle body and fuel consumption.

Although an electromagnetic clutch is employed in the above described embodiment, another clutch such as a torque converter can be used.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. A control system for a continuously variable transmission for transmitting the power of an internal combustion engine to driving wheels of a motor vehicle through a clutch, the transmission having a drive pulley including a hydraulically shiftable disc and a first hydraulic cylinder for shifting the disc, a driven pulley including a hydraulically shiftable disc and a second hydraulic cylinder for operating the disc of the driven pulley, and a belt engaged with both pulleys, the control system including a first hydraulic circuit comprising a line pressure control valve having ports including an inlet port and an outlet port and a first spool for controlling a line pressure, a transmission ratio control valve having ports and a second spool, said first hydraulic circuit having a pump communicating with the first hydraulic cylinder through the line pressure control valve at the inlet and outlet ports thereof and through the transmission ratio control valve and with the second hydraulic cylinder through a passage communicating with the inlet port, the system comprising:

a second hydraulic circuit for supplying control oil to the line pressure control valve so as to shift the first spool;

control valve means provided in the second hydraulic circuit for controlling the amount of the control oil supplied to the line pressure control valve to control the line pressure of the oil supplied to the second hydraulic cylinder at the inlet port and outlet port of the line pressure control valve;

first means for detecting disengagement of said clutch at stopping of the motor vehicle and for producing a first signal;

second means responsive to the first signal for controlling said control valve means to control the line pressure to produce a low line pressure which is lower than a minimum value of the line pressure during driving of the vehicle and is necessary to tense the belt so as to prevent slipping thereof upon re-engagement of the clutch.

2. The control system according to claim 1 wherein the control valve means is a solenoid operated on-off valve.

3. The control system according to claim 1 wherein the second hydraulic circuit is provided with a regulator valve for maintaining the pressure of control oil in said second hydraulic circuit at a constant value.

4. The control system according to claim 1 wherein the clutch is an electromagnetic clutch.

5. The control system according to claim 1, wherein said clutch is a torque converter.

6. The control system according to claim 1, wherein said clutch is connected between said engine and said drive pulley.

7. The control system according to claim 1, wherein said first means detects the disegagement of the clutch by detecting driven pulley speed lower than a predetermined value.

8. The control system according to claim 1, wherein said second means is further responsive to occurrence of said first signal for a predetermined time so as thereafter to control said control valve means so as to produce said low line pressure.

9. The control system according to claim 8, further comprising
means responsive to driven pulley speed for disengaging said clutch when said driven pulley speed is lower than a predetermined value.

10. The control system according to claim 1, further comprising
line pressure means for controlling said control valve means responsive to actual transmission ratio and engine torque to control the line pressure to said minimum value during driving of the vehicle, so as to hold the belt on the pulleys at a necessary minimum force without slipping of the belt.

11. The control system according to claim 10, wherein
said low line pressure is set at a minimum value to tense the belt so as to prevent slipping thereof upon the re-engagement of the clutch.

12. The control system according to claim 1, wherein said low line pressure is set at a minimum value to tense the belt so as to prevent slipping thereof upon the re-engagement of the clutch.

13. The control system according to claim 1, wherein the transmission ratio control valve communicates with said line pressure from said line pressure control valve to further control said line pressure to said first hydraulic cylinder.

14. A control system for a continuously variable transmission for transmitting the power of an internal combustion engine to driving wheels of a motor vehicle through a clutch, the transmission having a drive pulley including a hydraulically shiftable disc and a first hydraulic cylinder for shifting the disc, a driven pulley including a hydraulically shiftable disc and a second hydraulic cylinder for operating the disc of the driven pulley, and a belt engaged with both pulleys, the control system including
a first hydraulic circuit comprising a line pressure control valve having ports and a first spool for controlling a line pressure, and a transmission ratio control valve having ports and second spool, said first hydraulic circuit having a pump for supplying oil to the second hydraulic cylinder controlled by the line pressure control valve and for supplying oil to the first hydraulic cylinder via the line pressure control valve and the transmission ratio control valve,
a second hydraulic circuit for supplying control oil to the line pressure control valve so as to shift the first spool;
control valve menas provided in the second hydraulic circuit for controlling the amount of the control oil supplied to the line pressure control valve to control the line pressure of the oil supplied to the second hydraulic cylinder,
first means for detecting disengagement of said clutch at stopping of the motor vehicle and for producing a first signal;
second means responsive to the first signal for controlling said control valve means to control the line pressure to produce a low line pressure necessary to tense the belt so as to prevent slipping thereof upon re-engagement of the clutch.

15. The control system according to claim 14, further comprising
means for controlling the control valve means responsive to operating conditions of the engine and transmission to control the line pressure via the line pressure control valve.

* * * * *